United States Patent [19]

Paul et al.

[11] Patent Number: 5,258,583
[45] Date of Patent: Nov. 2, 1993

[54] MULTIPLE STAGE TORSION-BAR WEIGHING APPARATUS

[75] Inventors: Duane J. Paul; John Paul, both of Duncan, Okla.

[73] Assignee: Adrian J. Paul Company, Duncan, Okla.

[21] Appl. No.: 641,949

[22] Filed: Jan. 16, 1991

[51] Int. Cl.⁵ ............................................. G01G 21/08
[52] U.S. Cl. .............................. 177/259; 177/DIG. 9
[58] Field of Search ................. 177/256, DIG. 9, 257, 177/258, 259

[56] References Cited

U.S. PATENT DOCUMENTS 197,489  11/1877  Onslow .

Primary Examiner—George H. Miller, Jr.
Attorney, Agent, or Firm—Dunlap, Codding & Lee

[57] ABSTRACT

A multi-stage weighing apparatus having a primary force reducing torsion-bar assembly and a secondary force reducing means. The combination of the primary and secondary force reducers enabling the scale to measure the weight of very heavy objects while having relatively small overall dimensions.

12 Claims, 2 Drawing Sheets

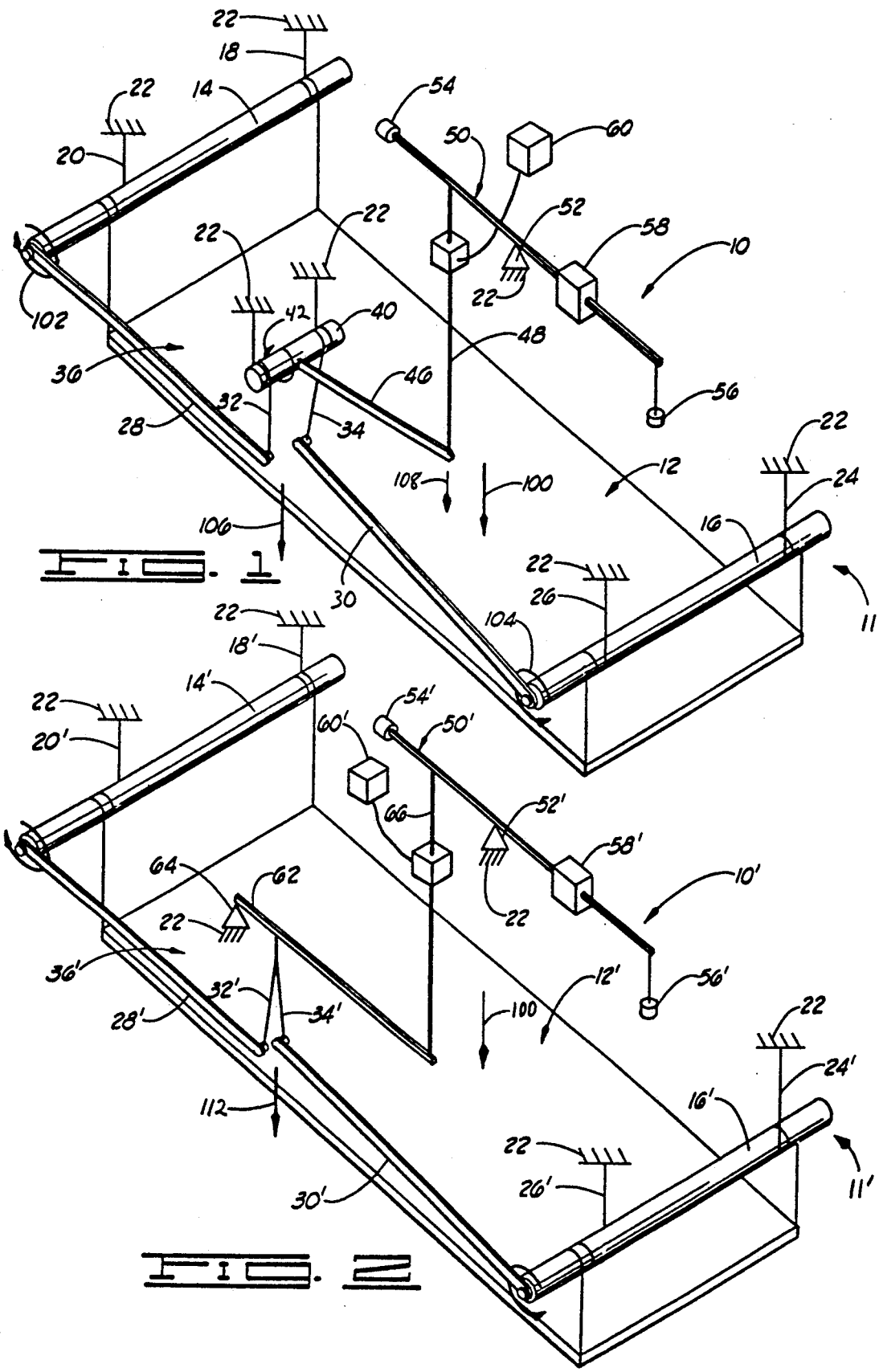

MULTIPLE STAGE TORSION-BAR WEIGHING APPARATUS

FIELD OF THE INVENTION

The present invention relates to weighing apparatuses and, more particularly, the present invention relates to a system having a primary weight reducing torsion-bar assembly and a secondary weight reducing means for proportionally reducing the weight transferred to a weight indicator.

BRIEF DESCRIPTION OF THE DRAWINGS

FIG. 1 is a diagrammatic perspective of an apparatus constructed in accordance with the invention.

FIG. 2 is a diagrammatic perspective of a second embodiment of an apparatus constructed in accordance with the invention.

DETAILED DESCRIPTION OF THE PREFERRED EMBODIMENTS

Figure 3:
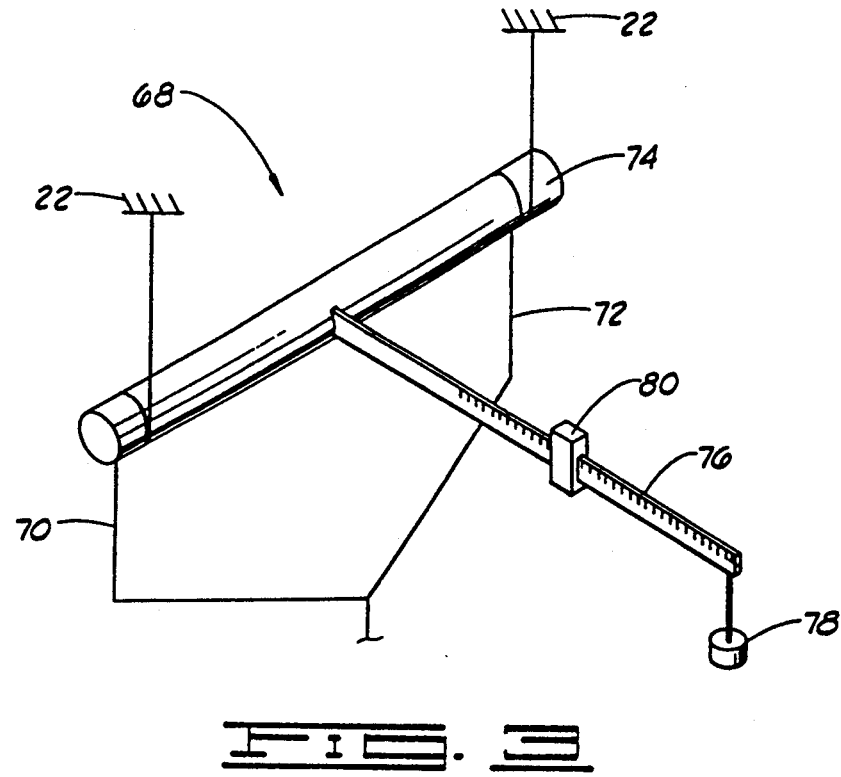
FIG. 3 is a torque-bar type balance beam which may be used with the invention.

Scales of various configurations have been devised in the past for weighing various objects. One of the earliest types of scales was the knife edge scale. The knife edge scale was and is very successful at weighing a certain object. However, it is not well adapted for weighing very heavy objects. The problem with knife edge scales is that as the weight of the object being weighed exceeds about 500 pounds, the knife edge provided with this type of scale begins to wear excessively. This wear and the friction associated with knife edge scales destroys their accuracy. In addition, as the scale's capacity is increased so is the length of the lever or beam which rests on the knife edge. Thus, in the past, knife edge scales used to weigh heavy objects have not only been vulnerable to wear and friction but were also relatively large.

Another very successful type of scale is the torque suspension weighing scale such as is disclosed in U. S. Pat. No. 2,736,549 issued to Paul on Feb. 28, 1956 which is specifically incorporated herein by reference. With a torque suspension scale the wear and friction problems are substantially eliminated. However, as with the knife edge scale, the higher the weight capacity of the scale the larger the lever became.

The present invention provides a weighing apparatus with a primary force reducing torsion-bar assembly coupled with a secondary force reducing means such that the invention can be used to weigh very heavy objects and yet the apparatus is relatively small.

Shown in FIG. 1 is a diagrammatic perspective view of a preferred embodiment of the invention 10, referred to as a multistage torque-bar scale. The scale 10 includes a primary force reducing torsion-bar assembly 11 with a platform 12 suspended therefrom. The platform 12 is adapted to support the object to be weighed during the weighing process. Bars 14 and 16 (sometimes referred to herein as the first bar 14 and the second bar 16) are disposed and rotatingly supported at opposite ends of the platform 12.

The bar 14 is supported by two flexible cables 18 and 20. One end of each cable 18 and 20 is connected to a fixed surface (all fixed surfaces being designated by the numeral 22 in the figures and these fixed surfaces 22 may comprise portions of the scale support structure). Each cable 18 and 20 is wrapped about one end portion of the bar 14 and disposed in grooves formed in the bar 14. The opposite end of each cable 18 and 20 is connected to one end of the platform 12.

The bar 16 is supported in a similar manner by two flexible cables 24 and 26. One end of each cable 24 and 26 is connected to the fixed surface 22. Each of the cables 24 and 26 is wrapped about one end portion of the bar 16 and disposed in grooves in the bar 16. The opposite end of each of the cables 24 and 26 is connected to one end of the platform 12. The platform 12 is thus supported at its four corners by the cables 18, 20, 24 and 26. One end of a first lever arm 28 is connected to one end of the bar 14, and one end of a second lever arm 30 is connected to one end of the bar 16.

A flexible cable 32 is connected to one end of the lever arm 28 and a flexible cable 34 is connected to one end of the lever arm 30. The opposite ends of the cables 32 and 34 are connected to a secondary force reducing means 36.

When a torsion-bar type secondary force reducing means 36 is 40. The opposite end of each cable 32 and 34 is secured to the fixed surface 22 thereby supporting the bar 40.

One end of a lever arm 46 is connected to the center of the bar 40 and one end of a flexible cable 48 is connected to the opposite end of the lever arm 46. The opposite end of the cable 48 is connected to a weight indicator such as a conventional weighing beam 50 as is shown in FIG. 1.

The weighing beam 50 is balanced on a fixed knife edge support 52 with a zero balance tail ball 54 at one end. A balance to hold weight multipliers 56 is secured to the opposite end of the beam 50. A movable poise 58 is positionable to provide the exact balance so the weight on the platform 12 may be visually read from weight graduation marks stamped on the beam 50.

An electronic weighing unit 60 to enhance the scale's ability to weigh nonstationary objects may be used with the scale 10. A suitable electronic weighing unit is described in detail in U.S. Pat. No. 4,836,304 issued to Paul on Jun. 6, 1989, and the disclosure of this patent specifically is incorporated herein by reference.

Shown in FIG. 2 is a diagrammatic perspective of another preferred embodiment of the invention 10'. The scale 10' has a primary force reducing torsion-bar assembly 11' identical to the assembly 11 shown in FIG. 1. As shown in FIG. 2, the primary force reducing torsion-bar assembly 11' includes bars 14' and 16', cables 18', 20', 24' and 26' and levers 28' and 30'. The scale 10' also includes a platform 12' adapted to support the object to be weighed during the weighing process.

The bar 14' is supported by two flexible cables 18' and 20'. One end of each of the cables 18' and 20' is connected to a fixed surface 22. Each cable 18' or 20' is wrapped about one end portion of the bar 14' and is disposed in grooves formed in the bar 14'. The opposite end of each cable 18' and 20' is connected to one end of the platform 12'.

The bar 16' is similarly supported by two flexible cables 24' and 26'. One end of each cable 24' and 26' is connected to the fixed surface 22. Each of the cables 24' and 26' is wrapped about one end portion of the bar 16' and disposed in grooves in the bar 16'. The opposite end of each of the cables 24' and 26' is connected to one end of the platform 12'. The platform 12' is thus supported at its four corners by cables 18', 20', 24' and 26'.

One end of a lever arm 28' is connected to one end of the bar 14' and one end of the lever arm 30' is connected to one end of the bar 16'. A flexible cable 32' is connected to one end of the lever arm 28' and a flexible cable 34' is connected to one end of the lever arm 30'. The opposite ends of these cables 32' and 34' are connected to a secondary force reducing means 36'.

When a knife edge type secondary force reducing means 36' is used, the opposite ends of the cables 32' and 34' are connected to the mid-portion of a beam 62. One end of the beam 62 rests on a knife edge support 64 and secured to the opposite end of the beam is a flexible cable 66. The opposite end of the cable 66 is connected to a weight indicator such as a conventional weighing beam 50'.

The weighing beam 50' may be identical to the weighing beam 50 shown in FIG. 1. As shown in FIG. 2, the weighing beam 50' is balanced on a knife edge support 52' with a zero balance tail ball 54' at one end. A balance to hold weight multipliers 56' is secured to the opposite end of the beam 50'. A movable poise 58' is positionable to provide the exact balance so the weight on the platform 12' may be read from the weight graduation mark stamped on the beam 50'.

An electronic weighing unit 60' may also be included to adapt the scale 10' for weighing nonstationary objects. A suitable electronic weighing unit is described in U.S. Pat. No. 4,836,304 which was previously incorporated herein by reference.

Shown in FIG. 3 is a torque-bar type weight indicator 68 which may be used in place of the conventional beam indicator 50 or 50' (FIGS. 1 and 2). The torque type weight indicator 68 includes a bar 74 supported by two flexible cables 70 and 72. One end of each cable 70 and 72 is connected to the fixed surface 22. Each cable 70 and 72 is wrapped about an end portion of the bar 74 and disposed in grooves found in the bar 74. The opposite end of each cable is secured to a secondary weight reducing means such as to lever arm 46 shown in FIG. 1.

One end of a lever arm 76 is connected to the center of the bar 74. Weight multipliers 78 are secured to the opposite end of the lever arm 76 by a balance, a movable poise 80 is positionable to provide the exact balance so the weight of an object may be visually read from weight graduation marks stamped on the beam 76.

Figure 4:
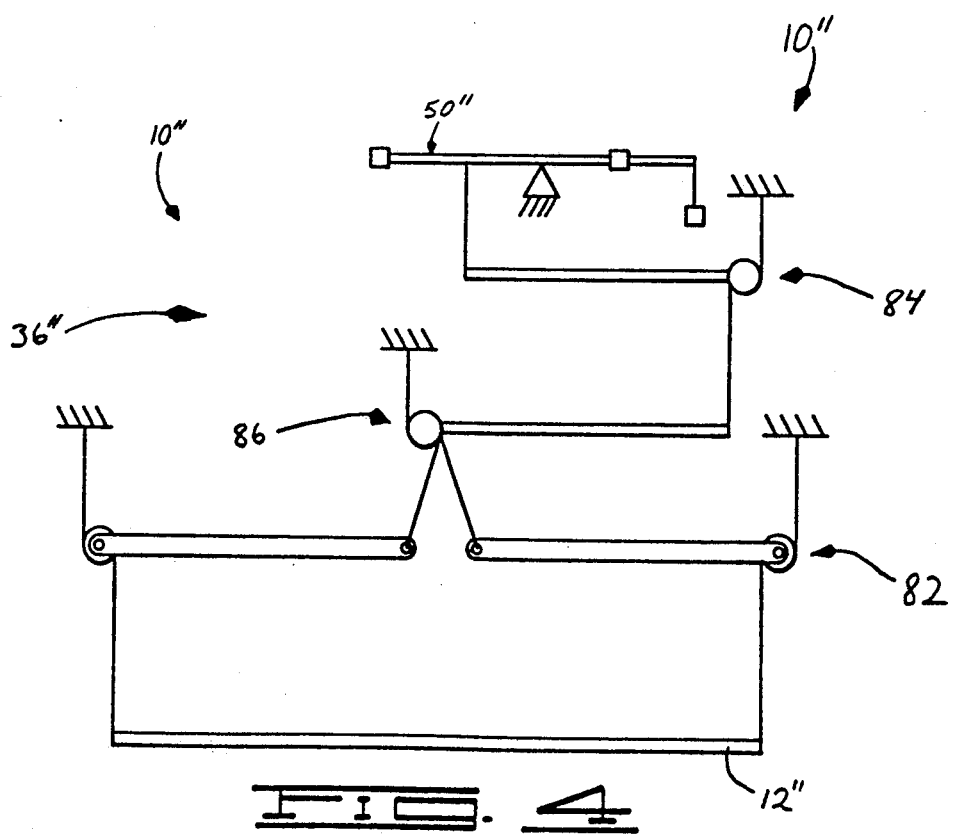
FIG. 4 is a schematic representation of yet another embodiment of an apparatus constructed in accordance with the invention.

Shown in FIG. 4 is a schematic view of a multi-stage weighing apparatus 10" having a platform 12" suspended from a primary force reducing torsion-bar assembly 82. The apparatus 10" uses two torsion-bar type force reducers 84 and 86 as the secondary force reducing means 36". Apparatus 10" also includes a weight indicator which in this case is a conventional beam indicator 50".

The secondary weight reducing means 36" could be replaced with a combination of torsion-bar and/or knife edge type force reducers. However, torsion-bar force reducers are preferable due to the weight limitations and friction associated with knife edge force reducers. It should be noted that the number of force reducers utilized in the secondary force reducing means is not limited to one or two but may be as many as are desired.

The operation of the invention may be explained through the use of simplified examples.

EXAMPLE 1

Referring to the embodiment disclosed in FIG. 1, an object weighing X placed on the platform 12 exerts a weight force of X on the platform 12 generally in the direction 100. The weight force on the platform 12 exerts torque on the bars 14 and 16 in respective directions 102 and 104 by way of the cables 18, 20, 24 and 26. The torque forces on the bars 14 and 16 result in the lever arms 28 and 30 being forced in a generally downward direction thereby placing a downwardly directed force 106 on the cables 32 and 34. The downwardly directed force 106 on cables 32 and 34 is approximately equal to the weight of the object times a ratio of the diameter of the bars 14 and 16 to the length of the lever arms 28 and 30. If each lever arm 32 and 34 is thirty inches long and each bar 14 and 16 has a diameter of two inches then the downwardly directed force 106 would be about $X(2/30)$ or $x/15$.

The force 106 exerts torque force on bar 40 in direction 42. This torque force on the bar 40 results in the lever arm 46 being forced in a generally downward direction thereby placing a downwardly directed force Ios on the cable 48. The force 108 is approximately equal to the force 106 (i.e., $x/15$) times a ratio of the diameter of the bar 40 to the length of the lever arm 46. Assuming the lever arm 46 has a length of 20 inches and the bar 40 has a diameter of 2 inches then the downwardly directed force 108 would be about $x/15 (2/20)$ or $x/150$.

This downwardly directed force 108 is imposed upon weighing beam 50 and the force 108 is counter-balanced by the operator moving the poise 58 to provide a perceivable output indication of the weight of the object. Thus, by using multiple force reducing torsion-bars the weight force 100 in this example was reduced by 150 times down to a force which could be easily balanced by the weighing beam 50.

It should also be noted that the longest components in this example were lever arms 28 and 30 which were assumed to be thirty inches. Thus the overall length of the apparatus in this example would be only about five foot.

EXAMPLE 2

Referring now to the embodiment disclosed in FIG. 2, an object weighing X placed on the platform 12' exerts a weight force of X on the platform 12' generally in a direction 110. The weight force on the platform 12' exerts a torque on the bars 14' and 16' which results in a downwardly directed force 112 on cables 32' and 33' in the same manner as discussed in Example 1. If the bars 14' and 16' and lever arms 28' and 30' have the same dimensions as their counterparts in FIG. 1, the primary force reducing assembly would reduce the weight force of X down to a force of $X(2/30)$ or $x/15$ as in Example 1. The force 112 is imposed on a knife edge type secondary force reducing means 36'. Wherein the force 112 is further reduced by a ratio approximately equal to the distance from the knife edge 64 to the point where the cable 66 is secured to the beam 62 divided by the distance from the knife edge 64 to the point where the force 112 is imposed upon the beam 62. Assuming distances of twenty inches and two inches respectively, the secondary force reducing means 36' would reduce the force 112 by ten times resulting in a force of $x/150$ being imposed on the beam weight indicator 50'.

Here, as in Example 1, the apparatus reduces the weight imposed on the weight indicator by 150 times and with an overall apparatus length of only about five feet. It should be appreciated from the foregoing that by varying the size and number of secondary force reducers tremendous weights may be measured by a relatively small apparatus.

Changes may be made in the various components and assemblies described herein without departing from the spirit and scope of the invention as defined in the following claims.

What is claimed is:

1. A multi-stage weighing apparatus comprising:
   a fixed surface;
   a primary force reducing torsion-bar assembly secured to the fixed surface;
   a platform suspended from the primary force reducing torsion-bar assembly for supporting an object to be weighed, whereby the weight of the object imposes a force on the primary force reducing torsion-bar assembly;
   a secondary force reducing means secured to the fixed surface;
   means for transferring a force from the primary force reducing torsion-bar assembly to the secondary force reducing means; and
   a weight indicator comprising at least one of a weighing beam and an electronic weighing unit secured to the fixed surface;
   means for transferring a force from the secondary force reducing means to the weight indicator.

2. The apparatus of claim 1 wherein the secondary force reducing means comprises:
   a bar rotatably connected to the fixed surface and connected to the means for transferring force from the primary force reducing torsion-bar assembly whereby force received from the primary force reducing torsion-bar assembly rotates the bar; and
   wherein the means for transferring the force from the secondary force reducing means to the weight indicator comprises:
   a lever arm having one end secured to the bar and the opposite end connected to the weight indicator.

3. The apparatus of claim 2 wherein the weight indicator comprises:
   the electronic weighing unit secured to the means for transferring force to the weight indicator for enhancing the weighing apparatus' ability to weigh nonstationary objects.

4. The apparatus of claim 1 wherein the secondary force reducing means comprises:
   a knife edge support secured to the fixed surface; and
   a beam pivotally supported by the knife edge support, the beam being connected to the primary force reducing torsion-bar assembly and connected to the weight indicator whereby force received from the primary force reducing torsion-bar assembly is reduced and transferred to the weight indicator.

5. The apparatus of claim 4 wherein the weight indicator comprises:
   the electronic weighing unit secured to the means for transferring force to the weight indicator for enhancing the weighing apparatus' ability to weigh nonstationary objects.

6. The apparatus of claim 1 wherein the secondary force reducing means comprises:
   a plurality of torsion-bar force reducers secured in a series wherein the first torsion-bar force reducer in the series is connected to the primary force reducing torsion-bar assembly and the last torsion-bar force reducer in the series is connected to the weight indicator; and
   wherein each torsion-bar force reducer comprises:
   a bar rotatably connected to the fixed surface and to a means for transferring force;
   a lever arm having one end secured to the bar and the opposite end secured to another means for transferring force; and
   means for transferring force from one torsion-bar force reducer to the next torsion bar force reducer in the series.

7. The apparatus of claim 1 wherein the secondary force reducing means comprises:
   a plurality of knife edge force reducers secured in a series wherein the first knife edge force reducer in the series is connected to the primary force reducing torsion-bar assembly and wherein the last knife edge force reducer in the series is connected to the weight indicator; and
   wherein each knife edge force reducer comprises:
   a knife edge support secured to the fixed surface;
   a beam pivotally supported by the knife edge support; and
   means secured to the beam for transferring force from one knife edge force reducer to the next in the series.

8. The apparatus of claim I wherein the secondary force reducing means comprises:
   one or more torsion-bar force reducers wherein each torsion-bar force reducer comprises:
   a bar rotatably connected to the fixed surface and to a means for transferring force; and
   a lever arm having one end secured to the bar;
   means for transferring force from the torsion-bar reducer; and
   one or more knife edge force reducers each knife edge
   force reducer comprising:
   a knife edge support secured to the fixed surface;
   a beam pivotally supported by the knife edge support; and
   means secured to the beam for transferring force from the knife edge force reducer.

9. The apparatus of claim 1 wherein the platform includes opposite ends, and wherein the primary force reducing torsion-bar assembly comprises:
   a first bar having opposite ends and being rotatably connected to the fixed surface;
   at least two cables, each cable having one end connected to the fixed surface and the opposite end connected to the fixed platform, and each cable being wrapped about the first bar whereby the weight of the object to be weighed on the platform causes the first bar to rotate;
   a second bar having opposite ends and being rotatably connected to the fixed surface; and
   at least two cables, each cable having one end connected to the fixed surface and the opposite end connected to the fixed platform, and each cable being wrapped about the second bar whereby the weight of the object to be weighed on the platform causes the second lever to rotate.

10. The apparatus of claim 9 wherein the means for transmitting the force from the primary force reducing torsion-bar assembly to the secondary force reducing means comprises:

a first lever arm connected to the first bar;

a second lever arm connected to the second bar;

a cable connected to the first lever arm; and a cable connected to the second lever arm, the weight of the object to be weighed on the platform causing the first bar and the second bar to rotate and the rotation of the first and the second bars causing the cables connected to the respective first and second bars to be pulled with the force to be transferred to the secondary force reducing means.

11. The apparatus of claim 10 wherein the secondary force reducing means comprises:

a bar rotatably connected to the first surface; and wherein the cable connected to the first lever is wrapped about the bar and connected to the fixed surface, and wherein the cable connected to the second lever is wrapped about the bar and connected to the fixed surface whereby the force on the cables connected to the respective first and second levers causes the bar to rotate; and wherein the means for transferring the force from the secondary force reducing means to the weight indicator comprises:

a lever arm connected to the bar of the secondary force reducing means; and a cable connected to the lever arm connected to the secondary force reducing means and to the weight indicator whereby the rotation of the bar of the secondary force reducing means causes the cable of the secondary force reducing means to be pulled with the force to be transferred from the secondary force reducing means to the weight indicator.

12. The apparatus of claim 10 wherein the secondary force reducing means comprises:

a knife edge support secured to the fixed surface; and a beam pivotally supported by the knife edge support, the cables connected to the first and second levers being connected to the beam whereby the force on the cables connected to the first and second levers pivots the beam; and wherein the means for transferring the force from the secondary force reducing means comprises:

a cable connected to the beam and to the weight indicator whereby the pivoting of the beam pulls the cable with the force to be transferred to the weight indicator.

* * * * *

UNITED STATES PATENT AND TRADEMARK OFFICE
CERTIFICATE OF CORRECTION

PATENT NO. : 5,258,583
DATED : November 2, 1993
INVENTOR(S) : Duane J. Paul, et al.

It is certified that error appears in the above-indentified patent and that said Letters Patent is hereby corrected as shown below:

Column 2, Line 24; after is, please insert -- used each cable 32 and 34 is wrapped about one end portion of a bar--.

Column 2, Line 24, after 40., please insert -- The cables 32 and 34 are disposed in grooves formed in the bar 40.--.

Column 4, Line 24; before on, please delete "Ios" and substitute therefore --108--.

Signed and Sealed this

Twentieth Day of September, 1994

Attest:

BRUCE LEHMAN

Attesting Officer    Commissioner of Patents and Trademarks